United States Patent [19]

Sparks et al.

[11] Patent Number: 4,796,235
[45] Date of Patent: Jan. 3, 1989

[54] WRITE PROTECT MECHANISM FOR NON-VOLATILE MEMORY

[75] Inventors: Robert W. Sparks; Brian F. Wilkie; George G. Grimmer, Jr., all of Austin, Tex.

[73] Assignee: Motorola, Inc., Schaumburg, Ill.

[21] Appl. No.: 76,509

[22] Filed: Jul. 22, 1987

[51] Int. Cl.$^4$ .................. G11C 13/00; G11C 11/40
[52] U.S. Cl. ..................................... 365/228; 365/189
[58] Field of Search ............... 365/182, 189, 228, 230

[56] References Cited

U.S. PATENT DOCUMENTS

| | | | |
|---|---|---|---|
| 4,580,246 | 4/1986 | Sibigtroth | 365/189 |
| 4,612,632 | 9/1986 | Olson | 365/226 |
| 4,638,457 | 1/1987 | Schrenk | 365/189 |
| 4,644,494 | 2/1987 | Muller | 364/900 |
| 4,707,809 | 11/1987 | Ando | 365/189 |

Primary Examiner—Terrell W. Fears
Attorney, Agent, or Firm—John A. Fisher; Jeffrey Van Myers; Jonathan P. Meyer

[57] ABSTRACT

A write protect mechanism for a programmable read-only memory prevents writes to the PROM unless a protect register contains predetermined information. The protect register is itself a write protected control register. The predetermined information cannot be written into the protect register except during a short, predetermined period after the occurrence of an event such as a reset. The protect register may be written to with information other than the predetermined information at any time. The preferred embodiment comprises a single-chip microcomputer with on-board electrically-erasable programmable read-only memory which is write protected in several, separate blocks.

17 Claims, 3 Drawing Sheets

WRITE PROTECT MECHANISM FOR NON-VOLATILE MEMORY

FIELD OF THE INVENTION

The present invention relates, in general, to a write protect mechanism for a non-volatile memory. More particularly, the invention relates to a mechanism for protecting programmable read-only memory (PROM) which comprises a portion of a computer system from inadvertant writes.

BACKGROUND OF THE INVENTION

The use of PROM-type memories, either EPROM (erasable, programmable read-only memory) or EEPROM (electrically-erasable, programmable read-only memory), in both single-chip and board-level computers and controllers is rapidly increasing. In such a context, a PROM may store, for instance, an odometer reading in the case of an automotive controller or an account balance in the case of a "smart" banking card. Such parameters must be subject tto occasional alteration, but must also remain valid during periods of power-down and be protected from inadvertant alteration.

In a microcomputer such as the 68HC11, available from Motorola Microprocessor Products Group of Austin, Tex., all of the mechanisms necessary for programming the onboard EEPROM are integrated with the microcomputer. Most importantly, this includes the charge pump or other device necessary to generate the higher programming voltages required for EEPROMs. Thus, the EEPROM in such a microcomputer is readable and writable just as if it were random access memory (RAM), except, perhaps, for longer programming times.

In such a microcomputer, or other device in which no external control or input is required in order to program a PROM, inadvertant writes to the PROM are a major source of concern. Two basic approaches have been used to protect against such inadvertant changes. In presently-available versions of the above-mentioned 68HC11, several bits of a control register must be properly set to enable programming of the on-board EEPROM. The other basic approach recognizes that most inadvertant writes to PROM occur while power to the system is undergoing a transistion, such as on-to-off or off-to-on.

The former write protection approach operates on the principle that if the programming process is made more complex, it is more likely that any time the process is properly executed it is the result of an intentional attempt to program the PROM. However, since the sequence of instructions for programming the PROM must reside somewhere in program memory, and since there are times during power transitions when the system may be "wildly" executing instructions, there is some probability that the programming sequence will be hit and the contents of the PROM inadvertantly altered.

The latter approach solves the problem by detecting transitions in the power supply to the system and disabling the mechanism by which the PROM is programmed. U.S. Pat. Nos. 4,612,632 and 4,644,494 illustrate this method of write protecting a PROM. This solution is unattractive in the case of a single-chip microcomputer, and in some other cases, due to the requirement of a voltage level detection circuit. Such circuits are difficult to fabricate reliably and repeatably on the same chip as a microcomputer. Processing variations cause differences from chip-to-chip in the precise set-point of the voltage sensor, thus making the write protection unreliable.

U.S. Pat. No. 4,638,457 discloses a method of increasing the reliability of data stored in a PROM, but protects only against incomplete writes, not against inadvertant, but complete, writes.

U.S. Pat. No. 4,580,246, commonly assigned with the present invention, discloses a method of write protection for control registers. Writes to the control registers are allowed only once, and only within a short, predetermined time after the system is reset. After that period, no writes are allowed until the system is reset again. Obviously, this is reliable protection for certain types of control and configuration information, but cannot be used for PROM containing relatively large blocks of data, such as engine control parameters in an automotive controller, which would require more than the allowed period of time to re-program.

SUMMARY OF THE INVENTION

Accordingly, it is an object of the present invention to provide an improved apparatus and method for write protection of a PROM.

It is a further object of the present invention to provide an apparatus and method of write protection for a PROM which cannot be defeated by an inadvertantly-executed sequence of instructions.

Yet a further object of the present invention is to provide an apparatus and method of write protection for a PROM which does not require a voltage-sensing circuit.

Still a further object of the present invention is to provide an apparatus and method for providing independent write protection for a plurality of independently write protectable blocks of PROM.

These and other objects and advantages of the present invention are provided by a write protection apparatus for a PROM comprising protect register means for storing data; write protect means for allowing writes to the PROM if and only if said protect register means contains particular, predetermined data; and timer means for allowing said particular, predetermined data to be written into said protect register means only within a predetermined time of the occurrence of a predetermined event.

These and other objects and advantages of the present invention will be apparent to one skilled in the art from the detailed description below taken together with the drawings.

DETAILED DESCRIPTION OF THE INVENTION

Figure 1:
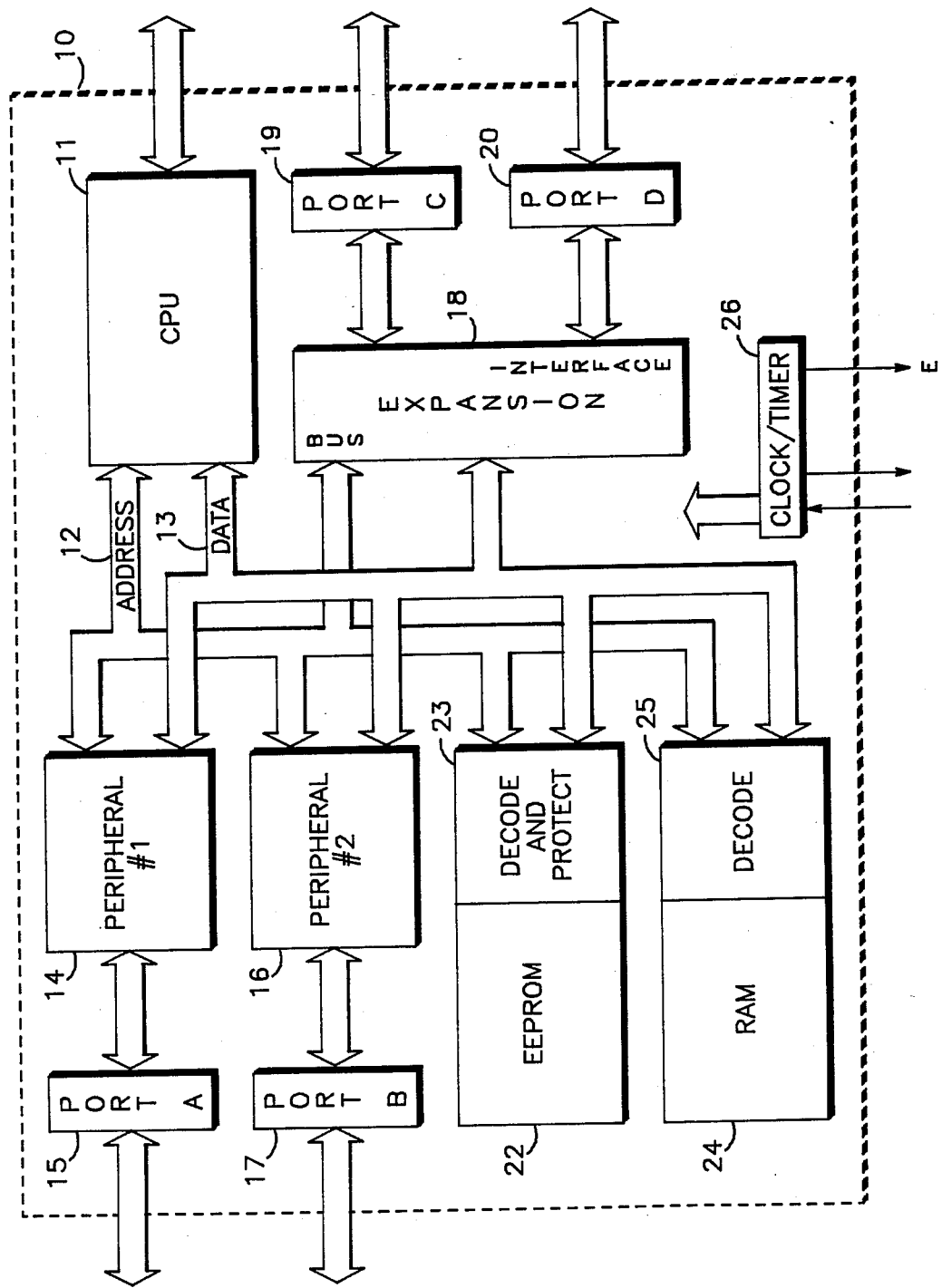
FIG. 1 is a block diagram illustrating a mmicrocomputer of a preferred embodiment of the present invention.

Referring now to FIG. 1, a single-chip microcomputer 10 is illustrated in block diagram form. While the present invention is disclosed in the context of this preferred embodiment, the principles of the present invention are applicable to board-level computer systems, memory systems and other embodiments.

A central processing unit (CPU) 11 is coupled to an address bus 12 and to a data bus 13 for communication with other portions of microcomputer 10. CPU 11 is also coupled to a plurality of pins of microcomputer 10 for purposes of interrupts, mode selects, resets and the like. A first peripheral 14 is coupled to address bus 12 and to data bus 13. Peripheral 14 is also coupled, via port A control apparatus 15, to a plurality of pins of microcomputer 10. Peripheral 14 may be, for instance, a timer, a serial communication interface, an analog-to-digital converter or other peripheral device.

A second peripheral 16 is coupled to address bus 12 and to data bus 13. Peripheral 16 is also coupled, via port B control apparatus 17, to a plurality of pins of microcomputer 10. Peripheral 16 may be, for instance, a timer, a serial communication interface, an analog-to-digital converter or other peripheral device.

A bus expansion interface 18 is coupled to address bus 12 and to data bus 13. Bus expansion interface 18 is also coupled, via port C control apparatus 19 and port D control apparatus 20, to a plurality of pins of microcomputer 10. Bus expansion interface 18 serves to provide access to address bus 12 and data bus 13 to devices external to microcomputer 10.

An array of EEPROM 22 is coupled, via address decode and write protect logic 23, to address bus 12 and to data bus 13. Similarly, an array of random access memory (RAM) 24 is coupled, via address decode logic 25, to address bus 12 and to data bus 13.

A clock/timer apparatus 26 is coupled to several pins of microcomputer 10. Clock/timer apparatus 26 receives inputs either from an external clock signal generator or an external oscillator and provides various clock and timing signals to each of the other components of microcomputer 10 and to external devices. The basic clock signal supplied by clock/timer 26, both internally and externally, is referred to as the E-clock.

Various control signals, such as reset signals and the like, are also distributed throughout microcomputer 10, but are not illustrated here to preserve clarity. Similarly, power supply and distribution circuits are not illustrated. It is assumed that microcomputer 10 includes any necessary apparatus for programming of EEPROM 22 completely under program control.

Figure 2:
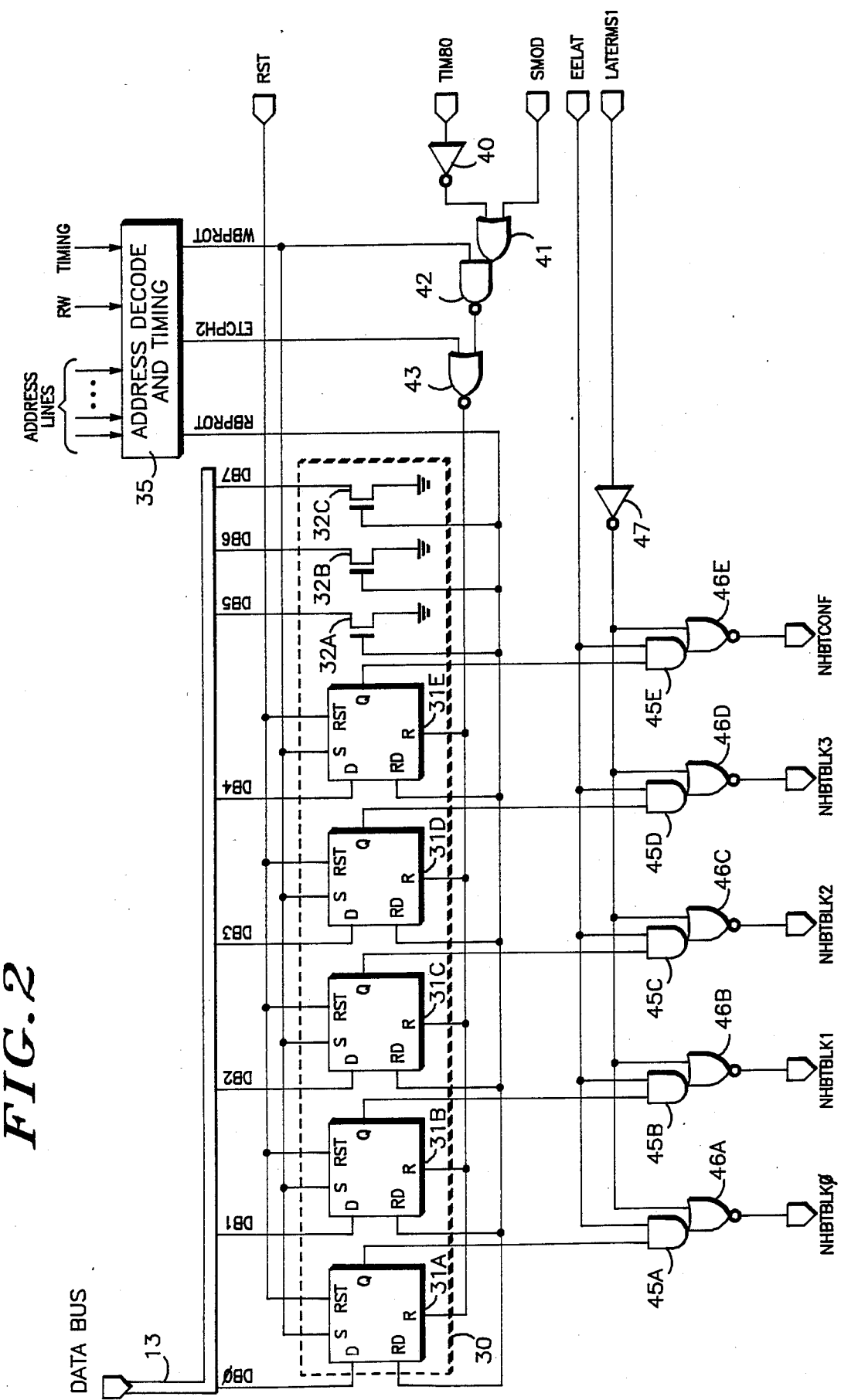
FIG. 2 is a detailed logic diagram of a portion of the microcomputer of FIG. 1.

Referring now also to FIG. 2, a portion of address decode and write protect logic 23 of FIG. 1 is illustrated. A block protect register 30 contains five bits of data, with the remaining three bits being unimplemented. The five implemented bits protect four blocks of EEPROM 22 and one control register, referred to by the mnemonic CONFIG (for configure), which is implemented using EEPROM cells. Except for the restrictions on clearing (forcing to a logic low) the bits of register 30 as described below, register 30 is similar to any other control register of microcomputer 10. In the preferred embodiment, it resides at address $_035 (addresses are given in hexadecimal form and the leading "_" indicates that the most significant hex digit does not matter). Register 30 is also referred to by the mnemonic BPROT (for block protect).

Each bit of register 30, when set (i.e., when it reads as a logic high) prevents writes to its associated block of EEPROM 22 or to CONFIG, as the case may be. Each bit comes out of a reset of microcomputer 10 in the set state. Each bit may be read or set by CPU 11 at any time, but may be cleared only during the first 64 E-clock cylces following a reset. The circuits of FIG. 2 (and FIG. 3) implement this functionality, as is described in detail below.

Figure 3:
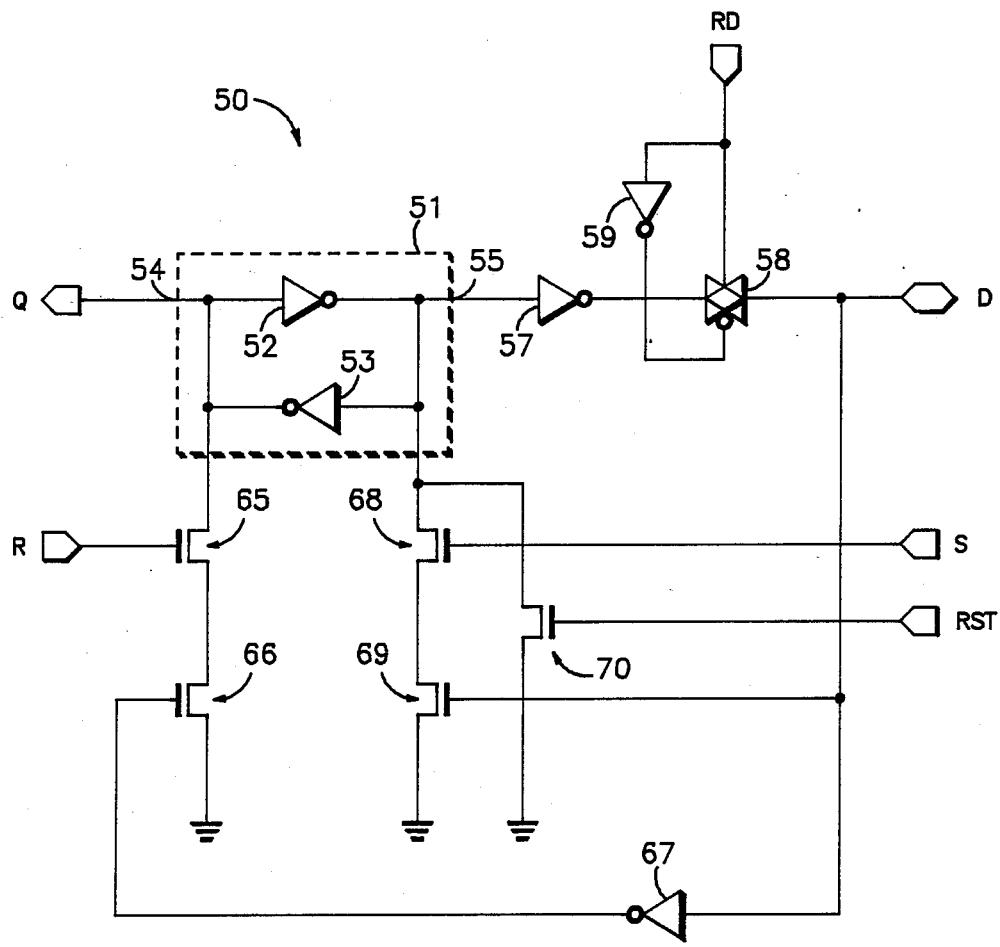
FIG. 3 is a detailed logic diagram of a portion of the apparatus of FIG. 2.

Each of the lower five bits of register 30 comprises a special latch circuit 31a-31e, respectively. FIG. 3 illustrates the details of such a latch circuit. Each of the upper three bits of register 30 comprises an N-channel pull-down transistor 32a-32c, respectively.

Each special latch circuit 31a-31e has a D (for data) bidirectional terminal. The D terminals of latch circuits 31a-31e are coupled, respectively, to data lines DB0-DB7 of data bus 13. Data lines DB5-DB7 of data bus 13 are coupled, respectively, to the source terminals of transistors 32a-32c. Each of the drain terminals of transistors 32a-32c are coupled to ground.

Each special latch circuit 31a-31e has a RST (for reset) input which is coupled to a line carrying a signal RST. RST is the system reset signal for microcomputer 10.

Each special latch circuit 31a-31e has an S (for set) input which is coupled to a line carrying a signal WBPROT (for write block protect). In addition, each special latch circuit 31a-31e has an RD (for read) input which is coupled to a line carrying a signal RBPROT (for read block protect). The gates of each transistor. 32a-32c are also coupled to the line carrying RBPROT.

Finally, each special latch circuit 31a-31e has an output Q and an input R which are connected and used in a manner to be described below.

The signals WBPROT and RBPROT are produced by address decode and timing logic 35. Logic 35 has inputs coupled to at least some of the address lines of address bus 12. In the preferred embodiment, the lower six address lines plus an internal register select signal are sufficient for logic 35 to determine when block protect register 30 is being addressed. Logic 35 also has inputs coupled to a RW (for read/write) signal and to at least one timing signal. In addition to the WBPROT and RBPROT signals mentioned above, logic 35 provides a timing signal ETCPH2. As is apparent from their mnemonics, WBPROT and RBPROT indicate, respectively, that an attempt is being made to write to or read from block protect register 30.

A time-out signal TIM80 provides the basis for the timing aspect of the block protect mechanism being described. In the preferred embodiment, TIM80 goes to a logic low state whenever a system reset is initiated and remains low for 64 E-clock cycles after microcomputer 10 comes out of reset and begins executing instructions, then goes high. The generation and use of a signal such as TIM80 are described in greater detail in U.S. Pat. No. 4,580,246.

A line carrying TIM80 is coupled to an inverter 40. The output of inverter 40 is coupled to an input of an OR gate 41. A line carrying a signal SMOD (for special mode) is coupled to another input of OR gate 41. The output of OR gate 41 is coupled to an input of NAND gate 42. A line carrying WBPROT is coupled to another input of NAND gate 42. An output of NAND gate 42 is coupled to an input of a NOR gate 43. Another input of NOR gate 43 is coupled to a line carrying the signal ETCPH2.

As is readily apparent, NAND gate 42 produces a logic low output if WBPROT is high (indicating an attempted write) and if the output of OR gate 41 is high. The output of OR gate 41 is high if either the inverse of TIM80 is high (indicating that the system is within the 64 E-clock cycle period of the last reset) or SMOD is high (indicating that the system is in a special, or test mode). NOR gate 43 simply acts to condition the output of NAND gate 42 with the timing signal ETCPH2 (and to invert the sense of the signal) to produce a properly timed signal which can be used to enable the clearing, or writing of a logic low signal into, one or more of the bits of register 30. The output of NOR gate 43 is coupled to the R (for reset, or clear) inputs of each of special latch circuits 31a–31e.

As will be more clear from the description of FIG. 3, below, special latch circuits 31a–31e may be cleared only if a logic high signal is present at the R input. Thus, no bit of block protect register 30 may be cleared except during the first 64 E-clock cycles after a reset or during a test mode. Since the WBPROT signal is provided to the S inputs of special latch circuits 31a–31e any time it is generated, the bits of register 30 may be set at any time.

The Q output of special latch circuit 31a is coupled to an input of an AND gate 45a. Another input of AND gate 45a is coupled to a line carrying a signal EELAT. The signal EELAT is the output of one bit of a control register referred to by the mnemonic PPROG, which controls the programming and erasing of EEPROM 22. Specifically, EELAT is logic high when PPROG is set up to configure EEPROM 22 for programming, or writing. EELAT is low when EEPROM is configured for reading only.

An output of AND gate 45a is coupled to an input of NOR gate 46a. Another input of NOR gate 46a is coupled to an output of an inverter 47, whose input is coupled to a line carrying a signal LATERMS1. The signal LATERMS1 is a timing signal used to enable the row decode logic of EEPROM 22. An output of NOR gate 46a is a line carrying a signal NHBTBLK0 (for inhibit block 0). The signal NHBTBLK0, when logic high, enables the row decode logic for a first block (block 0) of EEPROM 22. When NHBTBLK0 is logic low, that row decode apparatus is disabled, or inhibited.

When the sggnal EELAT is low, indicating that only reads of EEPROM 22 are possible, the output of AND gate 45a is always low. Thus, whenever LATERMS1 goes high, that input of NOR gate 46a goes low and NHBTBLK0 goes high, enabling the row decode logic of block 0 of EEPROM 22. In this condition, the state of latch circuit 31a cannot effect attempted access to EEPROM 22, since only reads are taking place.

If, however, EELAT is logic high, which allows for programming of EPROM 22, then the output of AND gate 45a will be low if and only if the Q output of latch circuit 31a is low; that is, if latch circuit 31a is cleared. If latch circuit 31a is cleared, the NHBTBLK0 will be high whenever LATERMS1 is high. Thus, normal access to block 0 of EEPROM 22 is permitted. However, when latch circuit 31a is set (the Q output is high) NHBTBLCK0 is always logic low, preventing access to block 0 of EEPROM 22 until either EELAT is forced low or latch circuit 31a is cleared.

The logic involving latch circuit 31a, AND gate 45a, NOR gate 46a and the signals EELAT, LATERMS1 and NHBTBLK0 is duplicated for each of the other implemented bits of register 30. Thus, the output of NOR gate 46b is a line carrying the signal NHBTBLK1, which enables, if high, the row decode logic for block 1 of EEPROM 22, and so on. The output of NOR gate 46e is a line carrying the signal NHBTCONF, which enables, if high, the decode logic for the CONF register, thus providing it the same write protection as is provided to EEPROM 22.

Referring now also to FIG. 3, a special latch circuit 50 is described. In the preferred embodiment, each of special latch circuits 31a–31e is constructed according to the schematic of FIG. 3. Latch circuit 50 has input terminals RD, S, RST and R, an output terminal Q and a bidirectional terminal D. A latch 51 comprises a first inverter 52 and a second inverter 53 coupled in the familiar latch arrangement. Latch 51 has terminals 54 and 55. For present purposes, latch 51 is said to be set when terminal 54 is in a logic high state and is said to be cleared when terminal 54 is is a logic low state. The Q output of latch circuit 50 is coupled to terminal 54 of latch 51, so that the Q output of latch circuit 50 represents the state of latch 51.

An inverter 57 has an input coupled to terminal 55 of latch 51. An output of inverter 57 is coupled, via a transmission gate 58, to bidirectional terminal D. Transmission gate 58 has a non-inverted input coupled to input terminal RD. Input RD is also coupled, via an inverter 59, to an inverted input of transmission gate 58. Therefore, when the signal present at input RD (RBPROT) is high, the inverted state of terminal 55, which corresponds to the non-inverted state of terminal 54, is coupled to bidirectional terminal D. This, of course, is the mechanism by which the contents of block protect register 30 may be read.

A drain terminal of an N-channel transistor 65 is coupled to terminal 54 of latch 51. A source terminal of transistor 65 is coupled to a drain terminal of an N-channel transistor 66. A source terminal of transistor 66 is coupled to ground. A gate terminal of transistor 65 is coupled to the R input of latch circuit 50. A gate terminal of transistor 66 is coupled to an output of an inverter 67. An input of inverter 67 is coupled to bidirectional terminal D. Thus, if the signal coupled to the R input (the output of NOR gate 43) is high and if the signal coupled to bidirectional terminal D (one of the data lines of data bus 13) is low simultaneously, then terminal 54 of latch 51 will be pulled low. This, of course, clears latch 51.

A drain terminal of an N-channel transistor 68 is coupled to terminal 55 of latch 51. A source terminal of transistor 68 is coupled to a drain terminal of an N-channel transistor 69. A source terminal of transistor 69 is coupled to ground. A gate terminal of transistor 68 is coupled to the S input of latch circuit 50. A gate terminal of transistor 69 is coupled to bidirectional terminal D of latch circuit 50. Thus, if the signals present at both the S terminal (WBPROT) and the D terminal are logic high simultaneously, then terminal 55 of latch 51 will be pulled low. This, of course, sets latch 51.

A drain terminal of an N-channel transistor 70 is coupled to terminal 55 of latch 51. A source terminal of transistor 70 is coupled to ground A gate terminal of transistor 70 is coupled to the RST input terminal of latch circuit 50. Therefore, if the signal present at the RST terminal (the system reset signal) is high, latch 51 will be set.

The apparatus described above provides an improved method of write protection for PROMs. A register containing write protection information always comes out of reset configured to prevent writes to the PROM. The register must be written to in order to change the protect information and allow writes to the PROM. Furthermore, such writes to the register to un-protect the PROM are permitted only at certain times. A write to the register which re-protects the PROM may occur at any time.

In the context of a microcomputer with on-board PROM, such as the preferred embodiment, the fact that no voltage sensor is required to write protect the PROM is a major advantage of the present invention. Further, even if the microcomputer is "wildly" executing instructions during a power down transition, no sequence of instructions is able to write to the PROM after the time-out signal has locked the register.

Among many other possible modifications to the preferred embodiment disclosed herein, it is possible that it would not be desirable to separately protect different blocks of PROM. Therefore, one could reduce block protect register to a single bit, which would protect all of the PROM in the system.

While the present invention has been shown and described with reference to a preferred embodiment thereof, various modifications and changes thereto will be apparent to one skilled in the art and are within the scope of the present invention.

We claim;

1. In a system comprising a PROM, a write protect register, clock means for providing a clock signal and write protect means for allowing writes to the PROM if and only if the write protect register contains predetermined data, a write protect control apparatus comprising:
   timer means responsive to the clock signal and to an external event to generate a timeout signal a predetermined number of cycles of the clock signal after the occurrence of the external event; and
   register protect means responsive to the external event and to the timeout signal for allowing the writing of the predetermined data into the write protect register only in the period between the occurrence of the external event and the generation of the timeout signal.

2. An apparatus according to claim 1 wherein:
   said with protect register means is responsive to said external event to store data other than said, predetermined data.

3. An apparatus according to claim 2 wherein:
   said external event is a reset.

4. An apparatus according to claim 1 further comprising:
   configure means for configuring the PROM for programming or for reading only, said write protect means is responsive to said configure means to allow access to the PROM regardless of said write protect register means if the PROM is configured for reading only.

5. An apparatus according to claim 1 wherein said write protect means further comprises:
   means for selectably disabling an address decoder.

6. An apparatus according to claim 1 wherein:
   said write protect register further comprises a plurality of bit storage locations;
   the PROM comprises a number of separately write protectable portions equal to the number of bit storage locations in said protect register; and
   said write protect means further comprises means for allowing writes to each of said separately write protectable portions only if a predetermined one of said bit storage locations is in a first, predetermined state.

7. An apparatus according to claim 6 wherein said timer means further comprises:

first means for generating a first logic signal which changes from a first state to a second state at a predetermined time after said external event; and
   second means for allowing said bit storage locations of said write protect register to be placed in said first, predetermined state only while said first logic signal is in said first state, said second means allowing said bit storage locations to be placed in a state other than said first, predetermined state at any time.

8. A data processing system comprising:
   CPU means for executing instructions;
   reset means for resetting the system in response to an external event;
   clock means for generating a clock signal and a timeout signal, said time-out signal changes from a first state to a second state a predetermined time after the system is reset by said reset means; and
   PROM means for storing data, said PROM means being readable and writable by said CPU means under control of said instructions; the data processing system being characterized by a write protect apparatus comprising:
   protect register means for storing information;
   write protect means for preventing said CPU means from writing to said PROM means, said write protect means being responsive to predetermined information stored in said protect register means to allow said CPU means to write to said PROM means; and
   means responsive to said time-out signal to allow said CPU means to store said predetermined information in said protect register means only if said time-out signal is in said first state.

9. A data processing system according to claim 8 wherein:
   said protect register means is responsive to said reset means to store information other than said predetermined information.

10. A data processing system according to claim 8 wherein:
    said CPU means is able to store information other than said predetermindd information in said protect register means regardless of the state of said time-out signal.

11. A data processing system according to claim 8 wherein said write protect means further comprises:
    means for selectably disabling an address decoder.

12. A data processing system according to claim 11 further comprising:
    configure means for configuring said PROM means for programming or for reading only, said write protect means is responsive to said configure means to allow access to said PROM means regardless of the information stored in said protect register means if said PROM means is configured for reading only.

13. In a system comprising a PROM, a write protect register, clock means for providing a clock signal and write protect means for allowing writes to the PROM if and only if the write protect register contains predetermined data, a method of protecting the PROM from inadvertent writes comprising the steps of:
    responding to an external event and to the clock signal by generating a timeout signal a predetermined number of cycles of the clock signal after the occurrence of the external event; and allowing the predetermined data to be written into the write protect register only during the period between the occurrence of the external event and the generation of the timeout signal.

14. A method according to claim 13 further comprising the step of:
   storing data other than said predetermined data in said write protect register in response to the occurrence of said external event.

15. A method according to claim 14 wherein:
said external event is a reset.

16. A method according to claim 13 wherein said step of allowing writes to the PROM further comprises the step of:
   selectably disabling an address decoder.

17. A method according to claim 16 further comprising the steps of:
   configuring the PROM for programming or for reading only; and
   allowing access to the PROM regardless of the data stored in said protect register if the PROM is configured for reading only.

* * * * *

UNITED STATES PATENT AND TRADEMARK OFFICE
CERTIFICATE OF CORRECTION

PATENT NO. : 4,796,235

DATED : January 3, 1989

INVENTOR(S) : Robert Wayne Sparks, et al

It is certified that error appears in the above-identified patent and that said Letters Patent is hereby corrected as shown below:

Column 7, Line 39 change "with" to --write--

Signed and Sealed this

Second Day of May, 1989

*Attest:*

DONALD J. QUIGG

*Attesting Officer*  *Commissioner of Patents and Trademarks*